UNITED STATES PATENT OFFICE 2,118,141

PROCESS FOR PREPARING HYDROXY-HYDROQUINONE

Frederic R. Bean, Rochester, N. Y., assignor to Eastman Kodak Company, Rochester, N. Y., a corporation of New Jersey No Drawing. Application October 14, 1936, Serial No. 105,567

10 Claims. (Cl. 260—154)

This invention relates to a process for the preparation of hydroxyhydroquinone.

Hydroxyhydroquinone (1,2,4-trihydroxybenzene) is ordinarily prepared by hydrolyzing hydroxyhydroquinone triesters, such as hydroxyhydroquinone triacetate, in the presence of mineral acids or alkalies. Prepared in this manner hydroxyhydroquinone is seriously contaminated by side-reaction products probably arising from decomposition of the hydroxyhydroquinone. The isolation of pure hydroxyhydroquinone from such impurities is very difficult and cannot be satisfactorily accomplished by ordinary means. Hydroxyhydroquinone is useful as a photographic developer, as an antioxidant for fats, oils, motor fuels and rubber, and, for most of these purposes, particularly the former, must be used in a highly purified form.

Now, I have found that hydroxyhydroquinone can be prepared in a form which lends itself to ready purification by ordinary means. The object, therefore, of my invention is to provide pure hydroxyhydroquinone. A further object is to provide a process for the preparation thereof. Other more specific objects will become apparent upon a complete perusal of these specifications.

Pure hydroxyhydroquinone can be prepared according to my invention by a process comprising subjecting a hydroxyhydroquinone triester to the action of water in the presence of a lower fatty acid. Hydroxyhydroquinone triacetate is advantageously employed. The triacetate can be prepared from quinone and acetic anhydride according to the method of Thiele,—Ber. 31, 1247 (1898). (Also see German Patents 101,607 and 107,508.) Other triesters can be similarly prepared from quinone and other acid anhydrides, such as propionic or butyric anhydride.

The following example serves to illustrate my invention. This example is not intended to limit my invention.

Example

Two gram molecular proportions of hydroxyhydroquinone triacetate were mixed with 1500 cc. of acetic acid in water (30 to 35% solution by weight). The resulting mixture was refluxed for several hours. At the end of this time, the two liquid layers had disappeared and a homogeneous solution obtained. The solution was cooled to 40°–50° C. and was then treated with decolorizing charcoal and filtered. The decolorized solution was distilled off under high vacuum at a temperature below 100° C. The vacuum was maintained until the hydroxyhydroquinone was completely freed from water and acetic acid. A practically quantitative yield of nearly white hydroxyhydroquinone was obtained, the product melting at 140° C. Further purification by recrystallization from suitable solvents can be effected if desired.

The quantity of acetic acid employed in the above example can vary over a wide range, but is advantageously equivalent to about a 30% to 35% aqueous solution. 60% and 10% aqueous solutions of acetic acid can be used without great difficulty. The time of refluxing should be sufficient to completely remove the ester groups. With 30% to 35% aqueous acetic acid, the time of refluxing is ordinarily about five or six hours. Clearly the time required will depend on the vigor of the refluxing and ordinarily moderate refluxing and longer time are desirable.

The organic acid employed need not be the same as the acid residue in the hydroxyhydroquinone triester, for example, hydroxyhydroquinone tripropionate can be hydrolyzed in the presence of acetic acid or hydroxyhydroquinone triacetate can be hydrolyzed in the presence of propionic acid. Hydroxyhydroquinone mono- or diesters can be similarly hydrolyzed.

By the term "lower fatty acid", I mean a fatty acid having an appreciable solubility in water, such as formic, acetic, propionic, butyric or valeric acids; i. e. a fatty acid of not more than five carbon atoms. The lower fatty acid appears to function as a catalyst accelerating the hydrolysis of the hydroxyhydroquinone ester. Catalysts, such as mineral acids or alkalies, have a deleterious effect, preventing the satisfactory isolation of hydroxyhydroquinone from the reaction mass, as pointed out above. When employing a lower fatty acid catalyst in accordance with my invention, the water, lower fatty acid catalyst and the lower fatty acid formed during the hydrolysis (i. e., by hydrolysis of the ester groups) can be effectively removed from the formed hydroxyhydroquinone by a simple distillation under sub-atmospheric pressure, advantageously below 100° C. The hydroxyhydroquinone obtained is practically pure as shown by its sharp melting point of 140° C. The most satisfactory method of determining the completion of the hydrolysis is by actual test of a sample of the hydrolysis product for ester groups.

What I claim as my invention and desire to be secured by Letters Patent of the United States of America is:

1. A process for preparing hydroxyhydroquinone comprising subjecting a hydroxyhydroquinone lower fatty acid ester to hydrolysis, in the presence of a lower fatty acid catalyst.

2. A process for preparing hydroxyhydroquinone comprising subjecting a hydroxyhydroquinone lower fatty acid ester to hydrolysis, in the presence of acetic acid catalyst.

3. A process for preparing hydroxyhydroquinone comprising subjecting a hydroxyhydroquinone lower fatty acid triester to hydrolysis, in the presence of acetic acid catalyst.

4. A process for preparing hydroxyhydroquinone comprising subjecting hydroxyhydroquinone triacetate to hydrolysis, in the presence of a lower fatty acid catalyst.

5. A process for preparing hydroxyhydroquinone comprising subjecting hydroxyhydroquinone triacetate to hydrolysis, in the presence of acetic acid catalyst.

6. A process for preparing hydroxyhydroquinone comprising hydrolyzing hydroxyhydroquinone triacetate with an aqueous solution of acetic acid catalyst containing from about 30% to about 35% by weight of acetic acid.

7. A process for preparing hydroxyhydroquinone comprising hydrolyzing a hydroxyhydroquinone lower fatty acid ester with an aqueous solution of a lower fatty acid catalyst, decolorizing the resulting solution and removing the water, the lower fatty acid catalyst and the lower fatty acid formed during the hydrolysis under sub-atmospheric pressure at a temperature below 100° C.

8. A process for preparing hydroxyhydroquinone comprising hydrolyzing a hydroxyhydroquinone lower fatty acid ester with an aqueous solution of acetic acid catalyst, decolorizing the resulting solution and removing the water, the acetic acid catalyst and the lower fatty acid formed during hydrolysis, under sub-atmospheric pressure at a temperature below 100° C.

9. A process for preparing hydroxyhydroquinone comprising hydrolyzing hydroxyhydroquinone triacetate with an aqueous solution of acetic acid catalyst, decolorizing the resulting solution and removing the water, the acetic acid catalyst and the acetic acid formed during hydrolysis, under sub-atmospheric pressure at a temperature below 100° C.

10. A process for preparing hydroxyhydroquinone comprising mixing together hydroxyhydroquinone triacetate, water and acetic acid and allowing the mixture to react until the hydroxyhydroquinone triacetate is changed to hydroxyhydroquinone.

FREDERIC R. BEAN.